C. J. P. Ariail,
Water Elevator,
N° 15,597.        Patented Aug. 26, 1856.
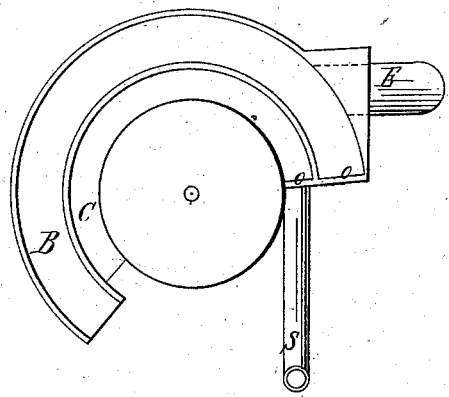
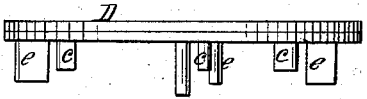
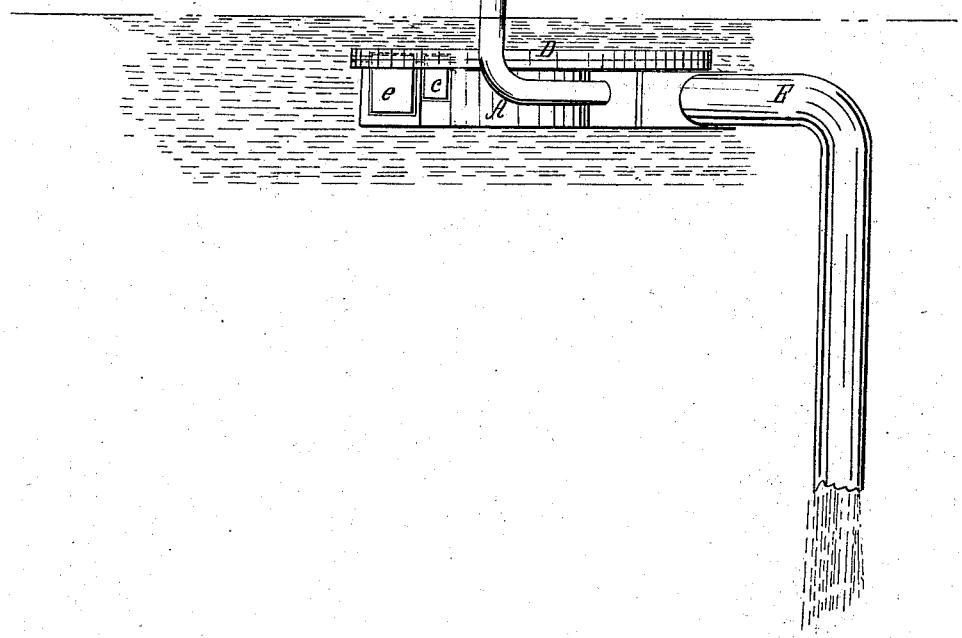

UNITED STATES PATENT OFFICE.

CHARLES J. P. ARIAIL, OF ROXBURY, CONNECTICUT.

METHOD OF APPLYING ONE STREAM OF WATER TO ASSIST IN RAISING ANOTHER.

Specification of Letters Patent No. 15,597, dated August 26, 1856.

*To all whom it may concern:*

Be it known that I, CHAS J. P. ARIAIL, of Roxbury, county of Litchfield, and State of Connecticut, have invented certain new and useful Improvements in Apparatus for Raising Water, of which the following is a full, clear, and exact description, reference being had to the accompanying drawing, making part of this specification.

Figure 1 represents a side elevation of my improved apparatus complete. Fig. 2 is a plan of the body or shell with the rotating plate and valves removed, showing the concentric annular grooves or channels, and Fig. 3, is also a side elevation of the rotating plate detached showing the self-acting valves from its lower surface in a vertical position.

Like letters indicate the same parts in all the figures.

The nature of my invention consists in the arrangement of two concentric annular channels, to which are fitted self-acting rotating valves, which valves are operated by suction and pressure for the purpose of elevating water.

To enable others skilled in the art to make and use my improved apparatus for elevating water, I will proceed to a description of the same in detail.

A in the accompanying drawing represents the body or shell in which are formed two concentric, annular channels (B) (C). To this shell is fitted a revolving plate (D) to which are secured self-acting valves (e) (c); these valves being arranged in pairs, each pair being connected and operating on the same pivot. These valves (e) (c), when passing over the ends (o) of the channels (B) (C), close in recesses formed in the lower surface of the plate (D) to which they are secured, dropping down after having passed (by their own gravity) to be in readiness to enter the channels again as seen in Fig. 1. The back of these valves rest against shoulders formed by the recesses in the plate (D) by which they are held in a vertical position while passing through the channels (B) (C).

To the channel (B) is arranged a siphon (E) Figs. 1 and (2)—by the suction of which and the pressure of water behind the valve (e) the plate (D) is caused to rotate. To the channel (C) is arranged a pipe (S) through the water confined in and forced through said channel by the valve (c) is elevated. The pipe (s) is somewhat smaller than the siphon (E) and may be varied according to the height or distance to which water is desired to be carried.

This apparatus is immersed in the reservoir as shown in red lines, Fig. 1, the escape water passing through the siphon (E) by which, and the pressure of water behind the valve (e) the apparatus is set in motion, while the water forced through the channel (C) by the valve (c) is conducted through the pipe (s) to any desired point.

Having thus fully described my improved apparatus for raising water, what I claim therein as new and desire to secure by Letters Patent is—

The arrangement for raising water of two concentric, annular channels, to which are fitted self-acting rotating valves; attaching to one channel a siphon, through the suction of which and pressure of water following, the rotating valves are operated, constructed and arranged substantially as described.

CHAS J. P. ARIAIL.

Witnesses:
  I. W. WOOD,
  GEO. W. ALLEMY.